July 23, 1935.  A. ROSNER  2,009,208

FORMATION OF CABLES

Original Filed March 18, 1929  4 Sheets-Sheet 1

INVENTOR.
Adolph Rosner
BY Jerome R. Cox
ATTORNEY.

July 23, 1935. A. ROSNER 2,009,208
FORMATION OF CABLES
Original Filed March 18, 1929 4 Sheets-Sheet 2
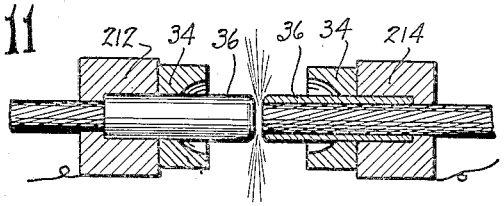
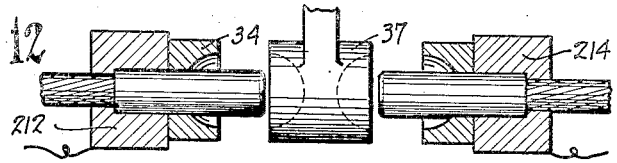
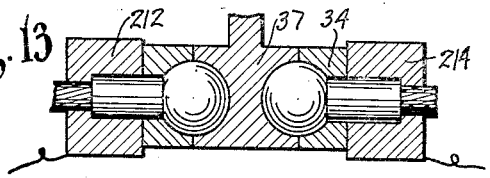
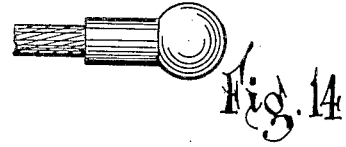
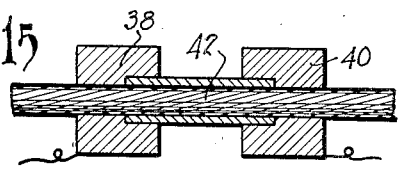
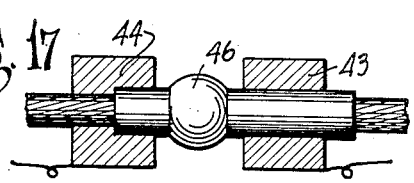
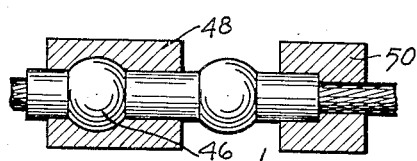
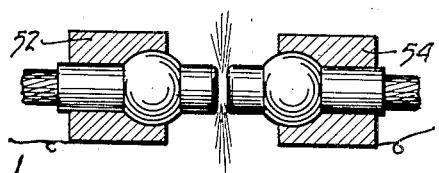
INVENTOR.
Adolph Rosner
BY Jerome R. Cox
ATTORNEY.

July 23, 1935.  A. ROSNER  2,009,208
FORMATION OF CABLES
Original Filed March 18, 1929  4 Sheets-Sheet 3

INVENTOR.
Adolph Rosner
BY Jerome R. Cox
ATTORNEY.

July 23, 1935. A. ROSNER 2,009,208
FORMATION OF CABLES
Original Filed March 18, 1929 4 Sheets-Sheet 4

INVENTOR.
Adolph Rosner
BY Jerome R. Cox
ATTORNEY.

Patented July 23, 1935

2,009,208

UNITED STATES PATENT OFFICE 2,009,208

FORMATION OF CABLES

Adolph Rosner, Rockton, Ill., assignor, by mesne assignments, to Bendix Brake Company, South Bend, Ind., a corporation of Illinois Original application March 18, 1929, Serial No. 347,882. Divided and this application December 10, 1932, Serial No. 646,727

3 Claims. (Cl. 219—3)

This application is a division of my copending application Serial No. 347,882.

This invention relates to a power transmission element and more particularly to methods of treating the same to sever it into sections, to form fittings on the ends of the newly formed sections and to secure novel attachments to the ends of said sections.

An important object of the invention is to effect a separation of the cable which leaves the newly formed cable ends slightly tapered and fused into an integral mass, the latter to obviate the flaring out or "brooming" of the strands that would ensue, should the cable be cut by ordinary methods.

A further object of the invention is to provide an anchor or attachment portion on the ends of the cable formed by my novel severing process and to this end the ends in their heated state may be then upset in suitably shaped dies. The ends may also be provided with supplemental fittings by providing the cable with a sleeve and then severing and upsetting the severed ends to provide the desired end enlargements.

In carrying out my novel cutting operation either with or without the supplemental sleeve, the area to be severed is preferably clamped between spaced electrodes or other suitable clamping chucks and subsequently heated to a malleable state. The clamps are then separated with the heating continued, which results in both drawing out and fusion of the center of the tensioned area, ultimately resulting in the desired rupture.

Further features of the invention relate to a method of preforming one end of a flexible cable; to specific couplings securing together the enlarged ends of the cable sections; to novel connections between the enlarged cable ends and rigid power transmission elements; and to various other details of construction and combinations of parts particularly set forth in the following descriptive matter and shown in the accompanying drawings, in which.

Figure 6:
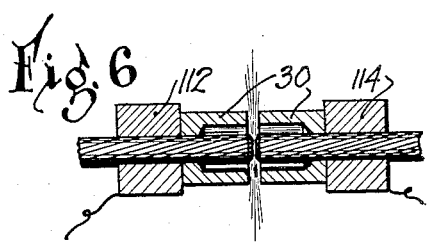
Figure 6 is a longitudinal sectional view similar to Figure 3 indicating the electrodes formed with shaping dies.
Figure 7:
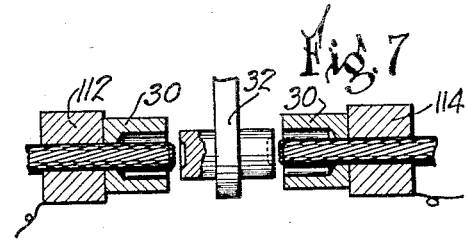
Figures 7 and 8 are longitudinal sectional views showing respectively the initial positioning of the shaping plunger and its ultimate position in shaping the cable ends.
Figure 8:
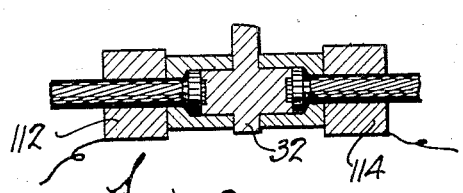
Figure 20:
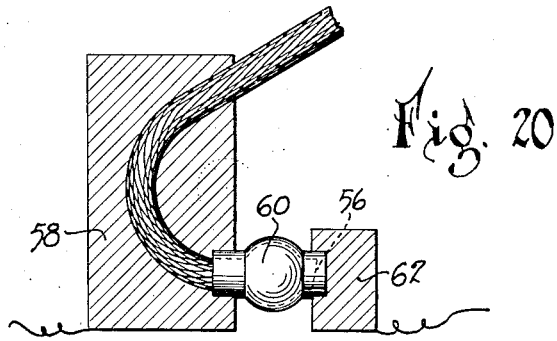
Figures 21, 22A:
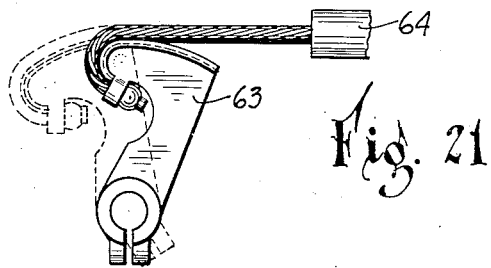
Figure 22:
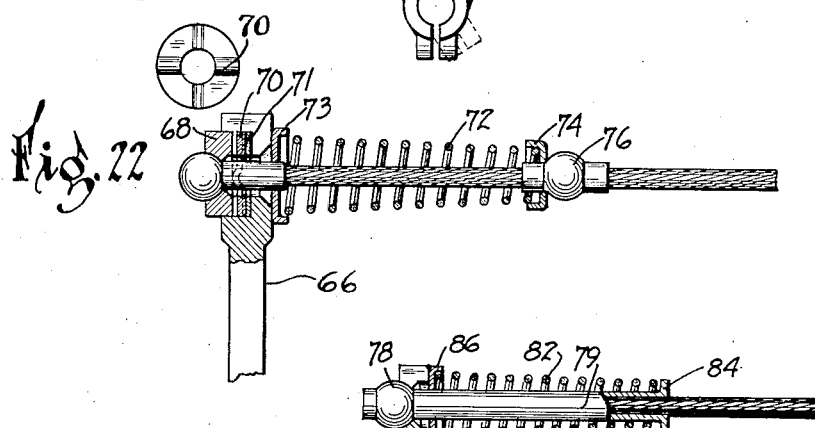

Figures 11, 12, and 13 are similar to the process steps indicated in Figures 6, 7, and 8, the cable ends in this case being covered by sleeves to be upset;

Figure 14 shows the product resulting from the process indicated in Figures 11, 12, and 13;

Figure 15 indicates in section the apparatus and work for effecting the product shown in Figure 16;

Figure 16 discloses the cable enlargement formed by the apparatus of Figure 15;

Figures 17, 18, and 19 indicate in sequence another manner of effecting the product substantially as shown in Figure 16;

Figures 20 and 21 show respectively the apparatus for preforming the cable end and the installed product;

Figures 22, 22A, 23, and 24 show, partially in section, means for connecting my novel headed cable to one end of a lever;

Figures 25, 26, 27, and 28 show another form of lever connection; and

Figure 9:
Figures 9 and 10 show two forms of cable ends fashioned by the invention described herein.
Figure 10:
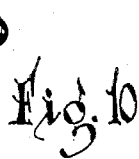
Figure 29:
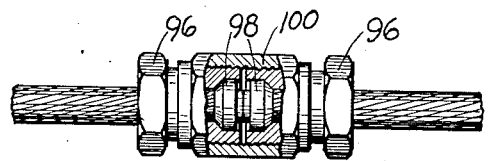
Figure 30:
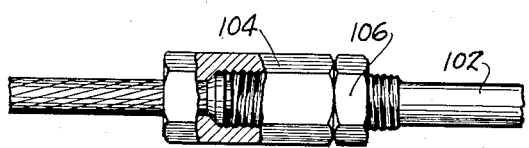

Figures 29 and 30 show types of unions for connecting the cable ends shown in Figures 9 and 10.

Figure 1:
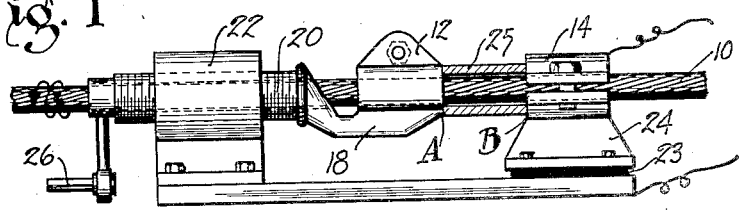
Figure 1 is a side elevation of one form of apparatus for effecting my severing process.

As disclosed in Figure 1, a multi-stranded helically wound high carbon steel cable 10 is clamped by spaced relatively movable two-part electrodes 12 and 14. Electrode 12, shown in the form of a split boss, is preferably rigidly secured to one end of a crooked extension 18 of a lead screw 20 threaded into a standard 22. Electrode 14 which is stationary, is preferably supported by a standard 24 insulated at 23. A two-part refractory shield 25 may be encircled about the cable between the clamps to obviate oxidation during the heating of the cable.

Figure 2:
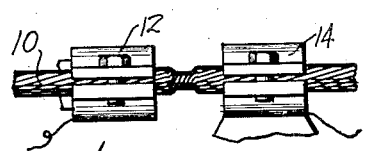
Figures 2 and 3 show respectively the twisting and ultimate severing of the cable.
Figure 3:
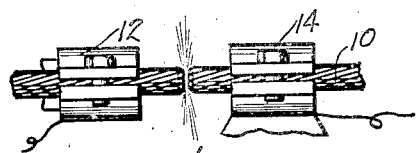
Figure 5:
Figure 5 shows the newly formed end of one section of the cable resulting from my novel severing process.

The cable to be severed is first positioned within the electrode clamps and thence threaded into an aligned insulated opening in the lead screw. A heating current of relatively high amperage and low voltage is then passed through the work which is progressively cooled by the electrodes, which may be water-cooled, from points A and B, Figure 1, to the geometrical center of the work. When the cable section between the electrodes is sufficiently hot to be easily drawn, the lead screw is slowly rotated by handle 26, effecting a centralized twisting and tensioning of the section, as shown in Figure 2. Continued drawing reduces the cross section of the cable, which automatically increases its electrical resistance, resulting in increased heating of the reduced section. Fusion of the area of least cross section is thus quickly effected, which results in its ultimate rupture, as indicated in Figure 3. A resultant arcing of the current also increases the temperature of the fused area to aid in effecting a homogeneous integral cable end.

Figure 4:
Figure 4 shows the condition of the cable after being cut by the usual means.

A very effective and expeditious severing process is thus carried out, resulting in a product well suited for its purposes. The slight taper made possible by the combined torsional and tensile stresses renders unnecessary any buffing off of the irregularities of the fused end, in view of the reduced diameter thereof. The twisting retains the original tight contact or wrap of the individually tapered wire strands and in this connection it is important to note that the hand of the lead screw 20 must be such as to agree with the hand of the pitch of the cable strands to effect this result. Furthermore the fusion of the end obviates the "brooming" effect or spreading out of the tensioned helical wires of the cable which would ordinarily result with manual cutting. This result is clearly shown in Figure 4. The cable core 28 of Figure 4 is normally drawn out or tensioned by the tight wound helical cover and with ordinary cutting tends to draw within the end of the cover. By my process, however, this is obviated inasmuch as the end of the core is fused with the ends of the wire cover.

The twisting of the area to be separated may be dispensed with by slightly modifying the apparatus of Figure 1 to provide only translatory motion to the movable heating and clamping unit 12. It is also contemplated that a plurality of cables may be simultaneously severed by arranging a plurality of the heating units of Figure 1 in tandem.

The above described severing process may be employed in providing cable sections with enlarged or headed ends, which ends may then be connected by novel unions to be described hereafter or one of said enlarged ends may be secured to one end of a lever or equivalent rigid power transmission member.

In that embodiment of my invention disclosed in Figures 6, 7 and 8, electrodes 112 and 114 may each be provided with shaping dies 30 having bores shaped as desired to fashion the ultimate product. The cable is first clamped into the electrodes which may be in two parts as shown in Figure 1. The work is then heated and electrode 112 moves away from electrode 114, which is preferably stationary, resulting in the rupture of the cable as previously described. While the cable ends are still hot, a floating plunger 32 or heading die is dropped between the die members and the movable electrode 112 is then closed upon the plunger and stationary electrode, resulting in shaping the ends as disclosed in Figure 8. As disclosed in Figures 9 and 10, various shaped cable ends may be fashioned depending upon the respective contours of the die and plunger ends.

In lieu of the cable ends formed in the manner just described, I may provide supplemental fittings on the ends as disclosed in the process set forth in Figures 11 to 13, inclusive. The relatively movable electrodes 212 and 214 may each be provided with hemispherical dies 34. Clamped in the electrodes are the ends of a sleeve member 36 such as shown in Figure 15, which sleeve surrounds the cable to be severed. The work is then electrically heated and severed in a manner previously described and then shaped by the heading die 37 as indicated in Figures 12 and 13 to effect the product shown in Figure 14. As previously described, the dies and plunger may be shaped to effect the desired contour of the cable end.

If a single enlargement or protuberance is desired in a continuous cable, the relatively movable electrodes 38 and 40 of Figure 15 are closed upon the heated sleeved cable 42 to upset the same as indicated in Figure 16. The same process might also be employed to form an enlargement on a rigid member.

In Figures 17, 18, and 19 a modified form of process for forming the enlarged cable's end is disclosed. As here disclosed the sleeve of Figure 15 is lengthened to extend through the stationary electrode 43. The work is then heated and upset by movable electrode 44 to form the enlargement 46 shown in Figure 17. The work is then transferred to the specially shaped movable electrode 48 which receives the enlarged portion 46. The process of heating and upsetting the work between the electrodes is then repeated, as shown in Figure 18, and the resulting product transferred to the clamping electrodes 52 and 54 of Figure 19 to be heated and severed in the manner described heretofore.

The dies heretofore described may be water-cooled so that in the process of upsetting the heated portion of the work, the cold die will bring about a quenching effect, this hardening to a certain extent the steel in the headed ends of the cable. A rigid member might also be substituted for the flexible cable member to be severed or headed.

In applying a flexible multi-stranded highly tensioned steel cable to a curved lever such as shown in Figure 21, it is desirable to preform the cable to the desired curve. This will give a set to the strands holding the same in place and obviating the wear that would otherwise ensue due to the relative sliding motion of the strands on one another during flexing. I accordingly suggest that the cable be first bent into the desired shape which will effect the slanting end 56 as indicated in dotted lines in Figure 20. The curvature of the cable is retained by a two-part stationary electrode 58 which clamps the cable with its sleeve 60 in the desired position. A movable electrode 62 is then clamped about the extreme end of the sleeve and cable, the work heated and then upset by relative motion of the electrode. The resulting product is a headed cable end, which head retains the desired curvature of the cable, preventing the wires thereof from slipping back to their normal position.

As shown in Figure 21, the preformed cable just described may be fitted within the peripheral groove of a lever 63, which lever is so shaped that the angle of motion which the lever described in operation does not change the alignment of the cable in the conduit 64, thus eliminating wear. In other words, with revolution of the lever the cable is drawn out of its conduit in a straight line, this being made possible by making the groove a portion of the circumference of a circle having its center coinciding with the axis of rotation of the lever.

The headed end of the cable disclosed in either Figures 14 or 19 may be secured to the radially slotted end of a rigid lever member 66. The enlargement preferably rests against a seat in the form of a plain faced washer 68 which in turn bears against an embossed washer 70 which in turn bears against a plain washer 71 contacting the base of the cylindrical recess in the lever end. A compression spring 72 confined between stops 73 and 74, the latter contacting cable enlargements 76, serves to retain the cable end in its seat.

Figure 23:
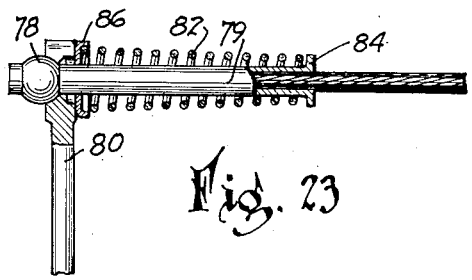
Figure 24:
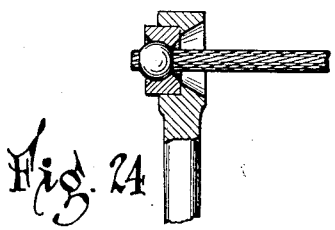
Figure 25:
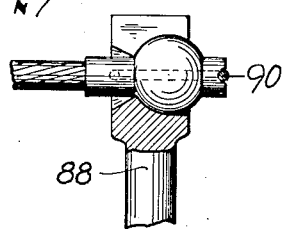
Figure 26:
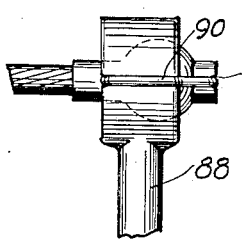
Figure 27:
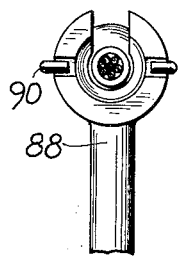
Figure 28:
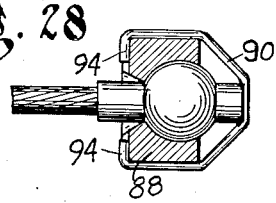

A modified connection is shown in Figure 23 wherein the enlargement 78 is provided with a relatively long sleeve 79 passing through the radially slotted end of the lever 80, a compression spring 82, confined between the flanged end 84 of the sleeve and a stop 86 abutting the lever, serving to retain the cable end in its seat. With both modifications just described the cable end has a substantially universal action, the ball and socket connection as well as the swiveling action of the embossed washers 70 facilitating this movement.

As disclosed in Figures 25 to 28, inclusive, the ball-shaped end of the cable of Figure 19 may be secured to the radially slotted lever end 88, the ball being seated within a correspondingly shaped recess in the lever end and secured in place by a U-shaped clip 90 seated within a groove 92 in the end of the cable and having its inturned ends 94 seated within recesses in the lever end.

The headed cable ends of Figures 9 and 10 may be connected in the manner disclosed in Figures 29 and 30. The gland nuts 96 of Figure 29 may be slipped over the cable prior to the forming of the integral heads 98 and are secured in place on the said heads by right and left threaded lock nut 100. As shown in Figure 30 the headed cable may be connected to a rigid member 102 such as a brake rod, the gland nut 104 in this construction having a relatively long interiorly threaded shank to adjustably receive the threaded end of the rod 102. A check nut 106 may be used, being threaded on the rod 104 into engagement with the end of the shank.

While several illustrative embodiments have been described in detail, it is not my intention to limit the scope of the invention to those particular embodiments, or otherwise than by the terms of the appended claims. Part of the subject-matter herein disclosed is claimed in my divisional application No. 747,757, filed October 10, 1934, as well as in my above-mentioned parent application 347,882 and in my companion divisional Case 646,726, filed December 10, 1932.

I claim:

1. That method of forming an enlargement on a power transmission member which comprises placing a sleeve on a section of the member, clamping said sleeved portion in spaced electrodes, heating the work between the electrodes to a malleable state and moving the electrodes toward each other to upset said cable and sleeve to form the desired enlargement.

2. The herein described method of forming cable ends which comprises clamping the sleeved portion of a transmission member in electrode members, heating and upsetting the work to form an enlargement, clamping said enlargement in a third electrode, again heating and upsetting the sleeved cable clamped between said third electrode and one of the first-mentioned electrodes, clamping the spaced enlargements thus formed in a pair of electrode clamps, and then heating and severing the connection between said enlargements to provide the desired cable ends.

3. That method of preforming the end of a multi-stranded cable which comprises inserting a sleeve member over the extreme end of said cable, bending the end and clamping the end so bent in relatively movable spaced electrodes, heating the work between said electrodes and then upsetting the sleeved cable so heated to provide an enlargement which retains the several strands of the cable in their bent condition.

ADOLPH ROSNER.